United States Patent [19]

Huber et al.

[11] 4,211,478
[45] Jul. 8, 1980

[54] CIRCUIT FOR INDICATING THE CONDITION OF THE BATTERY IN A PHOTOGRAPHIC CAMERA

[75] Inventors: Theodor Huber, Munich; Kurt Borowski, Aschheim; Gerhard Egger, Munich, all of Fed. Rep. of Germany

[73] Assignee: AGFA-Gevaert, A.G., Leverkusen, Fed. Rep. of Germany

[21] Appl. No.: 898,314

[22] Filed: Apr. 19, 1978

[30] Foreign Application Priority Data

Apr. 19, 1977 [DE] Fed. Rep. of Germany ....... 2717191

[51] Int. Cl.² .............................................. G03B 17/18
[52] U.S. Cl. .................................... 354/60 L; 320/48; 324/426
[58] Field of Search .......................... 324/29.5; 320/48; 354/53, 60 L, 289, 60 E; 340/636

[56] References Cited

U.S. PATENT DOCUMENTS

| | | | |
|---|---|---|---|
| 3,804,520 | 4/1974 | Noda et al. | 324/29.5 X |
| 3,832,629 | 8/1974 | Cernek, Jr. | 324/29.5 |
| 3,939,421 | 2/1976 | Barringer et al. | 324/29.5 X |
| 3,979,657 | 9/1976 | Yorksie | 320/48 X |

*Primary Examiner*—Michael L. Gellner
*Attorney, Agent, or Firm*—Michael J. Striker

[57] ABSTRACT

When the battery voltage is sufficient, and not nearing the point of insufficiency, a light-emitting diode is steadily illuminated. As the battery voltage decreases, the steady component of illumination decreases and also, when the decrease has proceeded to a certain extent, a superimposed pulsating component of illumination is introduced, causing the illuminated LED to begin to flicker, informing the user that the battery voltage is nearing insufficient values. As battery voltage drops further, the steady component of illumination ceases altogether, and the flicker converts to on-off blinking, indicating that the battery voltage is at the verge of an insufficient value. When the battery voltage drops further, the LED ceases to be illuminated. During part or all of the flicker phase, and/or during part or all of the blinking phase, the frequency of the pulsating component of illumination progressively increases with decreasing battery voltage, to create an effect of increasing urgency. In addition, or alternatively, at a certain point during pulsating illumination the frequency of the pulsating component is abruptly increased, likewise to create an effect of urgency.

13 Claims, 2 Drawing Figures

CIRCUIT FOR INDICATING THE CONDITION OF THE BATTERY IN A PHOTOGRAPHIC CAMERA

BACKGROUND OF THE INVENTION

The present invention relates to a circuit for indicating the battery voltage in still or motion-picture cameras. Typically, such monitoring and indicating circuits include a controllable-conductivity semiconductor element connected to the battery, and in the circuit of such element, an indicator element; the semiconductor element is conductive when the battery voltage is within the range of its operative (usable) values, and the indicator element indicates that this is the situation.

With typical prior-art battery-monitoring circuitry, the indicator element is illuminated until such time as the battery voltage has dropped to the lower limit of its usable values. When the battery voltage is near this lower limit, the indication provided by the indicator element is typically more or less indefinite, unreliable or unstable.

SUMMARY OF THE INVENTION

Accordingly, it is an object of the invention to provide a battery-monitoring circuit of the type in question, but of such operation as to more definitely indicate battery condition near the lower limit of useful battery voltage, and capable furthermore of enabling the user to distinguish between such battery-voltage values and battery-voltage values at, for example, the upper part of the range of usable values. Thus, the user of the camera is to be able to distinguish first that the battery voltage is sufficient for operativeness, and second whether the battery voltage is sufficient but only just sufficient, i.e., soon to become insufficient.

In the preferred embodiment of the invention, this is achieved as follows. The indicator element is additionally connected in circuit with an astable multivibrator. The astable multivibrator is provided with a control means which switches on the astable multivibrator when the battery voltage is in a second range lower than the highest first range of usable values; the second range may directly adjoin the first range, or may at least partly overlap into the first range. In this way, the total range of usable values of the battery output voltage is divided into two parts, both of which correspond to proper camera operation, and two distinguishable indications are provided, each associated with a part of this range. Thus, when the camera voltage drops to a value near the lower limit of the first range of useful values, or drops down to actually reach this lower limit, the perceivable character of the battery-condition indication undergoes a noticeable change. The user of the camera is thereby informed that the battery voltage, although still sufficient for operativeness, is nearing the point of inoperativeness.

In the preferred embodiment, the astable multivibrator is connected in parallel to the main-electrode path of the aforementioned controllable-conductivity semiconductor element, and the lower limit of the second range of usable battery-voltage values is equal to the lowest permissible battery-voltage value. Advantageously, the astable multivibrator is mainly comprised of a Schmitt-trigger stage and is of variable frequency, and the astable multivibrator is already switched on when the battery voltage is still within the first range of usable values.

In particular, the astable multivibrator can comprise an operational amplifier provided with an RC-stage. The inverting input of the operational amplifier is connected to the RC-stage, and its non-inverting input to the reference-voltage tap of a reference voltage divider. A semiconductor switch is connected either in the operating-voltage line of the operational amplifier, or else parallel to the capacitor of the RC-stage; the control electrode of this semiconductor switch is connected to the tap of a voltage divider which serves to establish the lower battery-voltage value.

Preferably, the positive-feedback branch of the operational amplifier, connected between its output and its non-inverting input, includes a variable resistor whose resistance varies in dependence upon battery voltage. Advantageously, the positive-feedback branch of the operational amplifier comprises two resistors, at least one of which is bridged by a semiconductor switch, the semiconductor switch serving to either short-circuit or not short-circuit such resistor in dependence upon the battery voltage. By thusly varying the feedback resistance of the operation amplifier, the so-called hysteresis range of the Schmitt trigger is automatically varied in dependence upon battery voltage. As a result, the frequency at which the indicator element employed flickers or blinks automatically varies.

The novel features which are considered as characterist for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
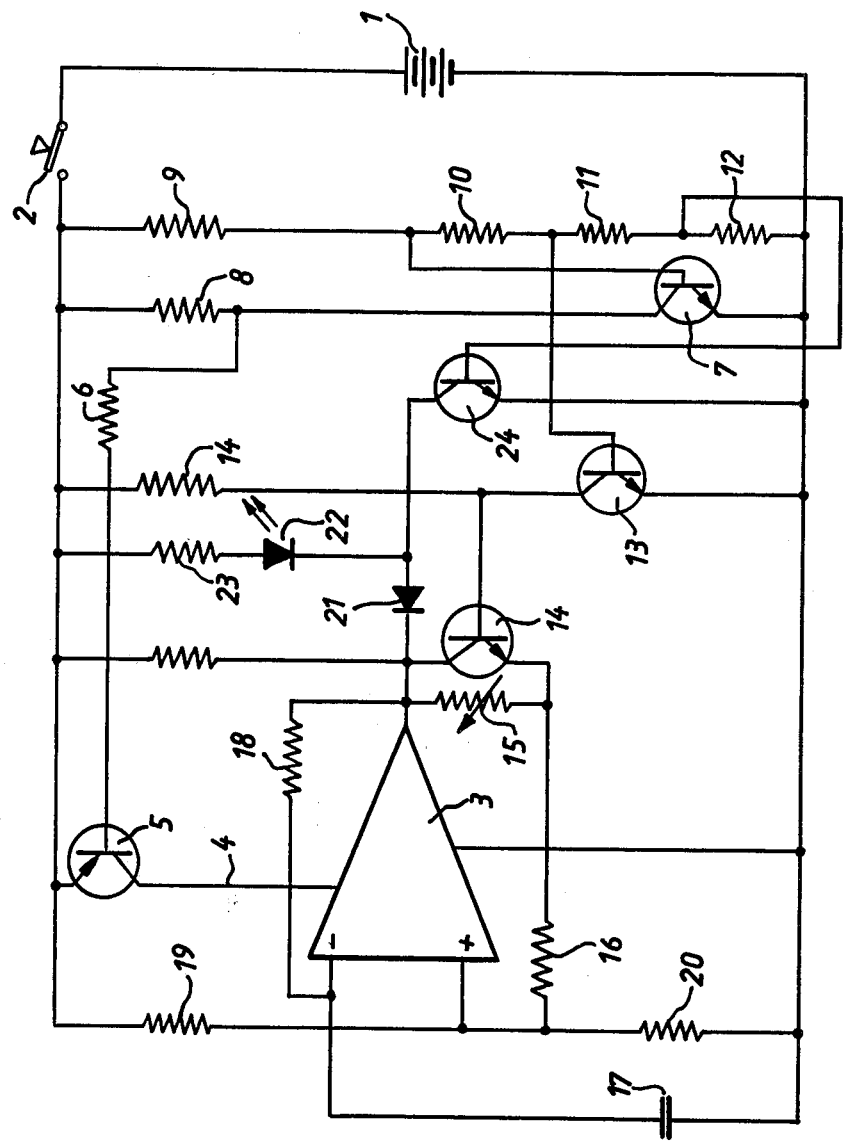
FIG. 1 illustrates one exemplary embodiment of the invention.

In FIG. 1, numeral 1 denotes the camera battery, which is to be understood to be connected to (non-illustrated) circuitry for the camera, e.g., an automatic diaphragm-control system, an exposure-duration control system, a shutter-control system, or the like. When a power-connect switch 2 is closed, the battery 1 becomes connected to such (non-illustrated) circuitry and also to the battery-monitoring circuit depicted in FIG. 1. An operational amplifier 3 has an operating-voltage line 4, in which is connected the emitter-collector path of a transistor 5. The base of transistor 5 is connected, via a resistor 6, to the collector of a transistor 7, the collector resistor of which is denoted by numberal 8. The base of transistor 7 is connected to the tap between two resistors 9, 10 of a three-tap voltage divider 9, 10, 11, 12.

The tap between voltage-divider resistors 10, 11 is connected to the base of a transistor 13, whose collector circuit contains a resistor 14. The collector of transistor 13 is connected to the base of a further transistor 14. The collector-emitter path of transistor 14 is connected parallel to a resistor 15. Resistor 15 and a resistor 16 are connected in series, between the output of operation amplifier 3 and the non-inverting input thereof, to constitute a positive-feedback branch for the operational amplifier 3. The inverting input of operational amplifier 3 is connected to a capacitor 17. A negative-feedback resistor 18 is connected between the output and the inverting input of the operational amplifier 3.

The non-inverting input of the operational amplifier 3 is connected to the tap of a voltage divider 19, 20, which serves to apply reference voltage to the non-inverting input.

The output of operational amplifier 3 is connected, via a normally reverse-biased diode 21, to the cathode of a light-emitting diode 22; the latter is connected in series with a protective resistor 23 which limits the voltage which can be applied across the anode-cathode path of light-emitting diode 22. The anode of diode 21 is connected to the collector of a switching transistor 24, whose base is connected to the voltage-divider tap between resistors 11 and 12.

The illustrated battery-monitoring circuit operates as follows:

When the output voltage of battery 1 is still within the highest first range of operative values, the voltage applied to the base of switching transistor 24, from the tap between voltage-divider resistors 11, 12, is high enough to keep transistor 24 fully conductive. Accordingly, steady current flows through the light-emitting diode 22. The diode 22 is steadily illuminated, and this steady illumination indicates to the user that the output voltage of the camera battery in fact is within the highest range of operative (i.e., usable) values. In this situation, diode 21 is non-conductive, because the voltage at its anode is more negative than the voltage at the output of operational amplifier 3.

When the output voltage of battery 1 decreases to a value lower than the highest first range of operative values, the voltage applied to the base of transistor 24 lowers, and the resistance of the collector-emitter path of transistor 24 increases, although transistor 24 continues to be conductive. Because transistor 24 is still conductive, steady current can continue to flow through light-emitting diode 22. However, as transistor 24 becomes less and less conductive, the magnitude of this steady current decreases correspondingly. Furthermore, superimposed upon this steady current through light-emitting diode 22 is a pulsating current. This pulsating current is provided by the components 3 and 15–20, which together constitute an astable multivibrator. In this situation, transistor 5 is conductive, because transistor 7 is conductive. Transistor 13 is likewise conductive, causing transistor 14 to be non-conductive. The two positive-feedback resistors 15, 16 determine the hysteresis of the Schmitt-trigger stage. The capacitor 17 of the multivibrator alternately charges up and discharges via resistor 18 within the input-voltage hysteresis. Thus, when the output voltage of battery 1 is within this lower second range of utilizable values, the light-emitting diode 22 is energized by a steady current component whose value decreases with decreasing battery-output voltage within this second range, plus a pulsating current component provided by the astable multivibrator 3, 15–20. Accordingly, light-emitting diode 22 is, for this second range, continually illuminated but with a superimposed flicker having a certain frequency.

When the output voltage of camera batter 1 drops so low that transistor 24 becomes non-conductive, transistor 24 no longer carries steady current for light-emitting diode 22. Accordingly, the previous flicker of the nevertheless continually energized diode 22 is replaced by a definite on-off blinking.

If the output voltage of the camera battery 1 drops further, transistor 13 becomes non-conductive and therefore transistor 14 becomes conductive. When transistor 14 becomes conductive, it effectively short-circuits resistor 15, thereby decreasing the breadth of the hysteresis of the astable multivibrator by a corresponding amount. As a result, the blinking frequency of light-emitting diode 22 increases correspondingly, to present the user with a more "urgent" indication.

If the output voltage of camera battery 1 drops still further, transistor 7 and therefore transistor 5 become non-conductive. Operational amplifier 3 ceases to be provided with operating voltage, and light-emitting diode 22 ceases to be illuminated altogether.

Figure 2:
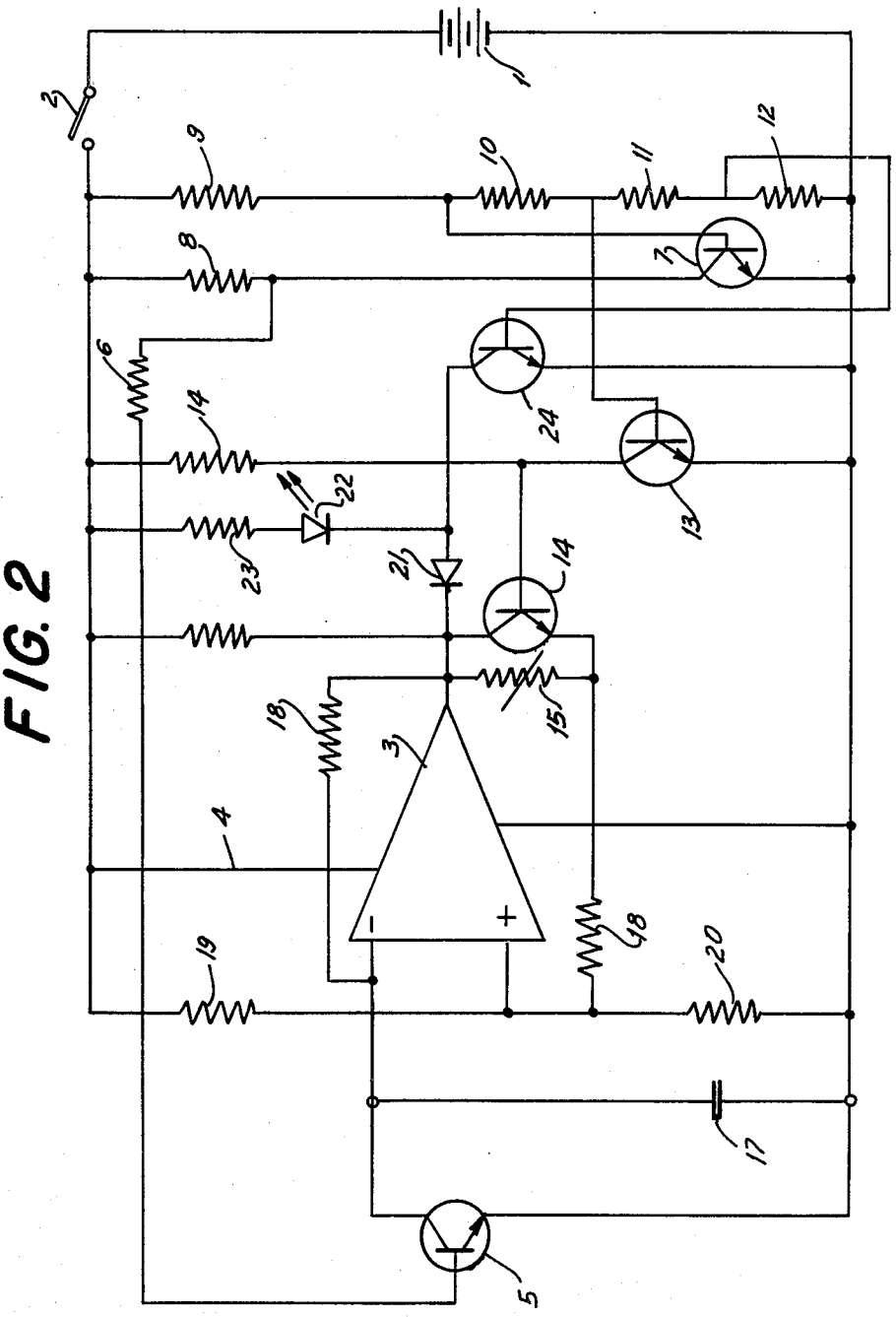
FIG. 2 depicts an exemplary modification of the embodiment depicted in FIG. 1.

FIG. 2 depicts a modification of the circuit of FIG. 1, in which instead of a transistor switch 5 being connected in the supply voltage line 4 of operational amplifier 3 a transistor switch 5' is connected across the timing capacitor 17 of the astable multivibrator.

It will be understood that each of the elements described above, or two or more together, may also find a useful application in other types of circuits differing from the types described above.

While the invention has been illustrated and described as embodied in a particular monitoring circuit capable of providing the user with several distinguishable indications of specified character, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a still or motion-picture photographic camera having a battery, a battery-monitoring circuit operative for monitoring the condition of the battery and indicating battery condition to the user, the circuit comprising an indicator element; a controllable-conductivity semiconductor element connected to the battery and to the indicator element and operative when conductive for carrying energizing current for the indicator element to cause the indicator element to generate a indication having a first character; an astable multivibrator also connected to the battery and to the indicator element and operative when switched on for causing the indicator element to be energized to generate an indication having a different second character; and means connected to the battery, the semiconductor element and the astable multivibrator operative for maintaining the semiconductor element conductive when the battery voltage is in a first range and operative for preventing and permitting oscillation of the astable multivibrator when the battery voltage is outside or in a second range, respectively, the astable multivibrator comprising an operational amplifier having inverting and non-inverting inputs, and RC-stage connected to the inverting input and a reference voltage divider connected to the battery and having a tap connected to the non-inverting input, said means including a semiconductor switch having a main-electrode path connected to the astable multivibrator to prevent and permit oscillation of the multivibrator in dependence upon the conduction state of the semiconductor switch and a voltage divider connected to the camera battery and having a tap connected to the control electrode of the semiconductor switch.

2. The circuit defined in claim 1, the main-electrode path of the semiconductor switch being connected in the operating-voltage line of the operational amplifier.

3. The circuit defined in claim 1, the main-electrode path of the semi-conductor switch being connected across the capacitor of the RC-stage of the astable multivibrator.

4. The circuit defined in claim 1, the operational amplifier having a feedback branch connected between its output and its non-inverting input, the feedback branch including a voltage-dependent resistor connected to undergo a change of resistance in dependence upon the battery voltage and thereby in dependence thereon vary the feedback resistance of the operational amplifier.

5. The circuit defined in claim 4, the feedback branch including at least two resistors, said means including at least one semiconductor short-circuiting switch connected across a respective one of the at least two resistors, said means including means for rendering the short-circuiting switch conductive or non-conductive in dependence upon the value of the battery voltage.

6. In a still or motion-picture photographic camera having a battery, a battery-monitoring circuit operative for monitoring the condition of the battery and indicating battery condition to the user, the circuit comprising an illuminatable indicator element and means connected to the indicator element and to the battery operative when the battery voltage is in a predetermined range of values for supplying the indicator element with energizing current illuminating the indicator element, the energizing current comprising a steady component resulting in a steady component of illumination of the indicator element and superimposed thereon a pulsating component resulting in a superimposed pulsating component of illumination of the indicator element giving the illumination of the indicator element the visually perceivable character of a distinct flicker visually distinguishable from simple steady illumination and visually distinguishable from on-off blinking action, the energizing current consisting at least predominantly of a steady current resulting in a visually perceived non-flickering steady illumination of the indicator element when the battery voltage is in a further range of values.

7. In a still or motion-picture photographic camera having a battery, a battery-monitoring circuit operative for monitoring the condition of the battery and indicating battery condition to the user, the circuit comprising an illuminatable indicator element and means connected to the indicator element and to the battery operative when the battery voltage is in a predetermined range of values for supplying the indicator element with energizing current illuminating the indicator element, the energizing current comprising a steady component resulting in a steady component of illumination of the indicator element and superimposed thereon a pulsating component resulting in a superimposed pulsating component of illumination of the indicator element giving the illumination of the indicator element the visually perceivable character of a distinct flicker visually distinguishable from simple steady illumination and visually distinguishable from on-off blinking action, the energizing current consisting substantially exclusively of a pulsating component when the battery voltage is in a further range of values resulting in an on-off blinking illumination of the indicator element visually distinguishable from the aforementioned flicker.

8. In a still or motion-picture photographic camera having a battery, a battery-monitoring circuit operative for monitoring the condition of the battery and indicating battery condition to the user, the circuit comprising an illuminatable indicator element and means connected to the indicator element and to the battery operative when the battery voltage is in a predetermined range of values for supplying the indicator element with energizing current illuminating the indicator element with energizing current illuminating the indicator element, the energizing current comprising a steady component resulting in a steady component of illumination of the indicator element and superimposed thereon a pulsating component resulting in a superimposed pulsating component of illumination of the indicator element giving the illumination of the indicator element the visually perceivable character of a distinct flicker visually distinguishable from simple steady illumination and visually distinguishable from on-off blinking action, the energizing current consisting at least predominantly of a steady current resulting in a visually perceived non-flickering steady illumination of the indicator element when the battery voltage is in a first range, the energizing current consisting at least predominantly of a pulsating current resulting in a visually perceived on-off blinking illumination of the indicator element when the battery voltage is in a second range, the on-off blinking illumination being distinguishable from the aforementioned flicker, said predetermined range in which the aforementioned flicker occurs being a range of battery voltage values shared by overlapping portions of said first and second ranges.

9. The circuit defined in claim 8, said means including means operative when the battery voltage is in said predetermined range for supplying the indicator element with an energizing current whose steady component is lower in value than the steady component furnished for establishing said non-flickering steady illumination, whereby to lower the steady component of illumination to an extend such that the pulsating component of illumination can readily be visually perceived despite its superposition upon an also perceivable steady component of illumination.

10. The circuit defined in claim 8, the pulsating current component increasing in frequency with decreasing battery voltage.

11. In a still or motion-picture photographic camera having a battery, a battery-monitoring circuit operative for monitoring the condition of the battery and indicating battery condition to the user, the circuit comprising an indicator element, and means operative when the battery voltage is in a high range for effecting simple steady illumination of the indicator element, when the battery voltage is in a lower range effecting a pulsating illumination of the indicator element with a frequency which progressively increases as the battery voltage progressively declines, and ceasing to illuminate the indicator element at all when the battery voltage has declined to a predetermined value.

12. In a still or motion-picture photographic camera having a battery, a battery-monitoring circuit operative for monitoring the condition of the battery and indicating battery condition to the user, the circuit comprising an illuminatable indicator element, and means operative for supplying illuminating current to the indicator element as a function of progressively decreasing battery voltage, the illuminating current effecting steady illumination of the indicator element when the battery voltage is in a range of high values, and as the battery voltage progressively decreases through a further range effecting superimposed steady and pulsating illumination of the indicator element with the steady and pulsating components of illumination being respectively low enough and high enough to result in a readily perceived flickering illumination readily distinguished from said steady illumination and also readily distinguishable from simple on-off blinking action, and as the battery voltage progressively decreases through a still lower range effecting on-off blinking action with a frequency which progressively increases as the battery voltage progressively decreases but then undergoes an abrupt and marked increase in frequency when the battery voltage has decreased down to a predetermined value.

13. In a still or motion-picture photographic camera having a battery, a battery-monitoring circuit operative for monitoring the condition of the battery and indicating battery condition to the user, the circuit comprising an indicator element, and means operative when the battery voltage has decreased and entered a predetermined range of values for effecting pulsating illumination of the indicator element with a frequency which progressively increases with progressive decrease of battery voltage but then undergoes an abrupt increase of frequency when the battery voltage has decreased to a predetermined value, whereby the progressive increase in the frequency of the pulsating illumination gives the user an effect of progressively increasing urgency whereas the abrupt increase in the frequency of the pulsating illumination gives the user an effect of extreme urgency.

* * * * *